United States Patent

Ushida

[11] Patent Number: 5,805,989
[45] Date of Patent: Sep. 8, 1998

[54] RADIO COMMUNICATION APPARATUS

[75] Inventor: Bunji Ushida, Amagasaki, Japan

[73] Assignee: Mitsubishi Denki Kabushiki Kaisha, Japan

[21] Appl. No.: 517,290

[22] Filed: Aug. 21, 1995

[30] Foreign Application Priority Data

Oct. 5, 1994 [JP] Japan .................................. 6-241401

[51] Int. Cl.⁶ .................................................. H04B 1/16
[52] U.S. Cl. ...................... 455/343; 455/38.3; 455/132; 455/277.1
[58] Field of Search ................... 455/38.3, 132, 455/133, 134, 135, 226.1, 226.2, 277.1, 277.2, 343, 140, 500, 38.2, 553, 127

[56] References Cited

U.S. PATENT DOCUMENTS

| | | | |
|---|---|---|---|
| 4,823,398 | 4/1989 | Hashimoto | 455/343 |
| 4,903,335 | 2/1990 | Shimizu | 455/343 |
| 5,361,404 | 11/1994 | Dent | 455/277.2 |
| 5,375,259 | 12/1994 | Lee | 455/277.2 |
| 5,390,357 | 2/1995 | Nobusawa et al. | 455/277.1 |
| 5,438,701 | 8/1995 | Yamada et al. | 455/343 |
| 5,566,364 | 10/1996 | Mizoguchi et al. | 455/134 |

FOREIGN PATENT DOCUMENTS 2-271724   11/1990   Japan .

*Primary Examiner*—William A. Cuchlinski, Jr.
*Assistant Examiner*—Gertrude Arthur
*Attorney, Agent, or Firm*—Rothwell, Figg, Ernst & Kurz, p.c.

[57] ABSTRACT

The present invention aims at reducing power consumption in a radio communication apparatus having a plurality of radio sections capable of selective switching by controlling power to be supplied to each of the radio sections. To this end, the apparatus includes: a power-supply condition memory section in which conditions for controlling power supply are previously set and stored; and a control section for controlling power supply to the other radio sections based on the value of a reception-signal quality signal from a currently selected radio section and the conditions previously set and stored to the power-supply condition memory section. A reference value for controlling power supply is previously set and stored to the power-supply condition memory section as a power-supply condition. At the control section, the value of a reception-signal quality signal from the currently selected radio section is compared with the reference value previously set and stored to the power-supply condition memory section. Power supply to the other radio sections is stopped when the receiving status of the currently selected radio section is excellent and power supply to the other radio sections is resumed when the receiving status is poor.

5 Claims, 5 Drawing Sheets

RADIO COMMUNICATION APPARATUS

BACKGROUND OF THE INVENTION

1. Field of the Invention

The present invention relates to radio communication apparatus having a plurality of radio sections capable of selective switching and, more particularly, relates to controlling of power supply to the radio sections.

2. Description of the Related Art

FIG. 7 is a block diagram showing a known radio communication apparatus having a plurality of radio sections capable of selective switching.

The construction of FIG. 7 includes: a radio section 1 for cellular communication; a radio section 2 for satellite communication; a talking route selecting switch 3 controlled by a control section to be described later; a control section 4 for selecting a communication route based on selecting conditions stored in a memory section to be described later and reception-signal quality signals of the radio sections 1 and 2; a memory section 5 for storing selecting conditions set by the user; and a talking section 6 connected to the radio section 1 or radio section 2 via the control section 4.

It should be noted that 1a and 2a denote base band signals provided from the radio sections 1 and 2, respectively, and 1b and 2b denote reception-signal quality signals provided to the control section 4 from the radio sections 1 and 2, respectively.

Its operation will be described below.

In the case where the construction as shown in FIG. 7 constitutes a mobile terminal of an apparatus which is adapted to be connected to a public telephone network based on a changeover between satellite communication and cellular communication, the control section 4 for selecting a communication route manages priorities on selecting a communication system provided as the selecting conditions to be set and stored to the memory section 5 by the user and the respective receiving status of the radio sections 1 and 2. Talking is effected through the route selected by the control section 4.

Since the known radio communication apparatus is constructed as described, the control section 4 is required to continuously supply power to all the radio sections which may be used. Specifically, in addition to switching of the talking route selecting switch 3 based on the receiving status of the radio sections 1 and 2, the reception-signal quality signals 1b and 2b from the radio sections 1 and 2 are continuously monitored to switch the talking route selecting switch 3. To obtain these signals, power must be continuously supplied to the radio sections 1 and 2, resulting in an intense consumption of power.

SUMMARY OF THE INVENTION

The present invention has been made to solve the problems associated with the known example as described above. It is an object of the present invention to provide a radio communication apparatus capable of achieving a reduction in power consumption by controlling power supply to be supplied to a plurality of radio sections.

To this end, a radio communication apparatus is provided in accordance with the present invention, comprising: a plurality of radio sections capable of selective switching; a power-supply condition memory section in which conditions for controlling power supply are previously set and stored; and a control section for controlling power supply to the other radio sections based on the value of a reception-signal quality signal from a currently selected radio section and the conditions previously set and stored to the power-supply condition memory section. Power to be supplied to the other radio sections is controlled based on the receiving status of the radio section which is being selected. It is possible to achieve a reduction in power consumption while maintaining a changeover function among a plurality of radio sections.

Further, a reference value for controlling power supply is previously set and stored to the power-supply condition memory section. At the control section, the value of a reception-signal quality signal from the currently selected radio section is compared with the reference value previously set and stored to the power-supply condition memory section. Power supply to the other radio sections is stopped when the receiving status of the currently selected radio section is excellent and power supply to the other radio sections is resumed when the receiving status is poor. It is thereby possible to secure an excellent receiving sensitivity at all times based on setting of a reference value as described. It is possible to achieve a reduction in power consumption while maintaining a changeover function among a plurality of radio sections.

Further, values of power supplying interval for the other radio sections corresponding to the reception-signal quality signal of the currently selected radio section are set and stored to the power-supply condition memory section. The value of power supplying interval for the other radio sections is obtained from the power-supply condition memory section by the control section based on the reception-signal quality signal from the currently selected radio section to set the power supplying interval for the other radio sections. Since power supplying interval to the other radio sections is controlled in accordance with the receiving status of a currently selected radio section, an abrupt worsening in the receiving status of the currently selected radio section may be immediately met by another radio section. It is thereby possible to secure an excellent receiving status at all times. It is possible to achieve a reduction in power consumption while maintaining a changeover function among a plurality of radio sections.

A talking route selecting condition memory section is furthermore provided for previously setting and storing conditions for selecting a talking route. Power supply to the respective radio sections is controlled by the control section based on the conditions previously stored to the talking route selecting condition memory section. It is thereby possible to control power supply to the respective radio sections according to a selection made by the user.

Further, priority for each radio section is set and stored to the talking route selecting condition memory section. At the control section, the priority for the currently selected radio section is compared with the respective priority of the other radio sections. A control is effected so that the power supply to each of the other radio sections is limited only when the respective priority for the other radio sections is lower. It is thereby possible to control supplying of power with a priority for each radio section being set according to a selection made by the user. It is possible to effect a control so as to limit power supply to the radio sections in accordance with such priority.

Furthermore, for each radio section, indispensability or dispensability of power supply control is set and stored to the talking route selecting condition memory section. Indispensability of effecting power supply control stored to the talking route selecting condition memory section is checked for each radio section. A control is effected so as to limit power supply to a radio section only when an indispensability thereof is set. Indispensability or dispensability of effecting power supply control may be set for each radio section according to a selection made by the user. It is thereby possible to control power supply only for those radio sections which require effecting of power supply control.

DESCRIPTION OF THE PREFERRED EMBODIMENTS

Embodiment 1

Figure 1:
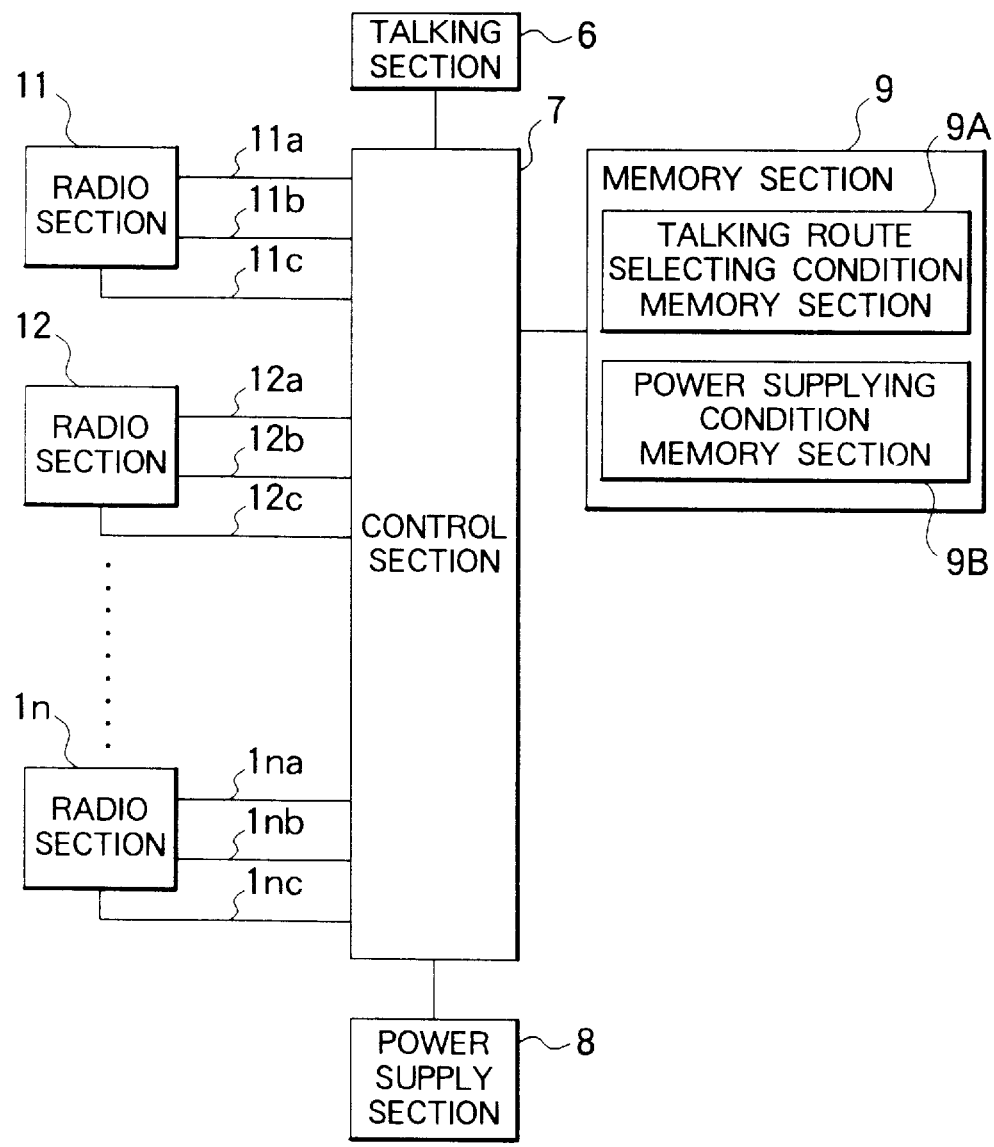
FIG. 1 is a block diagram showing a radio communication apparatus according to the present invention.

The present invention will be described below by way of some embodiments shown in the drawings.

FIG. 1 is a block diagram showing a radio communication apparatus according to Embodiment 1 of the present invention.

Included in FIG. 1 are a plurality of radio sections 11, 12, in provided within the radio communication apparatus; a talking section 6 connected to these radio sections by a control section to be described later; the control section 7 for controlling switching and power supply of the radio section to be connected to the talking section 6; a power supply section 8 of the radio communication apparatus; and a memory section 9 including a talking route selecting condition memory section 9A for storing talking route selecting conditions and a power-supply condition memory section 9B for storing conditions for supplying of power. Base band signals 11a, 12a, , 1na and reception-signal quality signals 11b, 12b, , 1nb are provided to the control section 7 from the respective radio sections 11, 12, , In. The control section 7 is adapted to control power supply to the respective radio sections 11, 12, , in through the power supply lines 11c, 12c, , 1nc.

Figure 2:
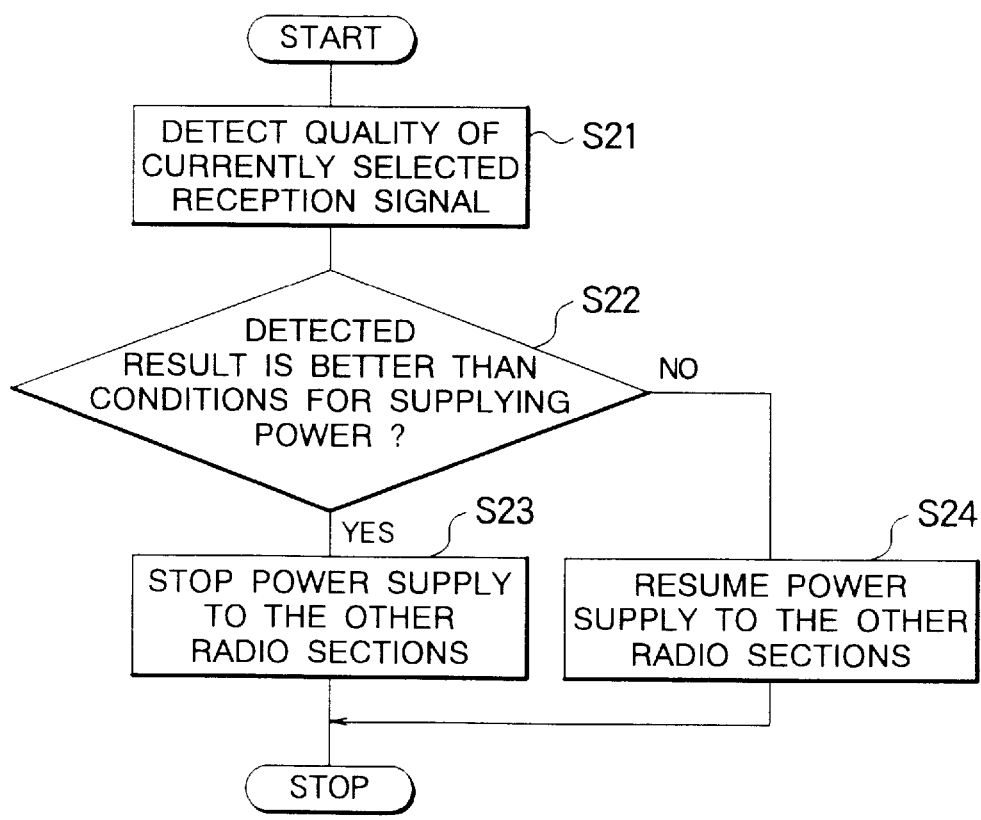
FIG. 2 is an operational flowchart of the control section according to Embodiment 1 of the present invention.

Operation according to the above construction will be described below with reference to a flowchart of FIG. 2 which shows operation of the control section 7 after selecting a communication route.

The control section 7 detects a reception-signal quality signal from a currently selected radio section which is represented for example by a received electric field strength or SN ratio of the reception signal or packet error rate (step S21) and compares it with the power supply conditions (step S22).

If, for example, the content of the reception-signal quality signal is the received electric field strength, the received electric field strength is converted at the radio section into a digital value corresponding to such strength (i.e., a larger value for a higher field strength and smaller value for a lower strength) to be transmitted to the control section 7. At the control section 7, this value is compared with a digital reference value previously set and stored to the power-supply condition memory section 9B of the memory section 9 whereby power supply to the other radio sections is controlled.

If, as a result of the comparison, the digital value provided as a reception-signal quality signal from the currently selected radio section is larger than the digital reference value previously set and stored to the power-supply condition memory section 9B, i.e., when the receiving status is excellent, communication is possible through the route which is currently being selected. Since the excellent status of receiving secures the fact that such route may be stably used, power supply to the other radio sections is stopped (step S23).

To the contrary, if the digital value provided as a reception-signal quality signal from the currently selected radio section is smaller than the digital reference value previously set and stored to the power-supply condition memory section 9B, i.e., when the receiving status is poor, supplying of operational power to the other radio sections is resumed because switching to another route may be necessary (step S24).

It should be noted that, in operation for selecting a talking route, the transmitting/receiving route is selected of the talking voice at the time of accessing to a network or establishing a call when the user has made the call by selecting a talking route. Further, a call in through a network is notified to the network side by declaring the selected route by means of transmission of a prescribed signal through a radio line, whereby transmitting/receiving route of the talking voice thereafter is selected.

In accordance with the above described Embodiment 1, the value of a reception-signal quality signal from the currently selected radio section is compared with a reference value previously set and stored to the power-supply condition memory section 9B. If the receiving status of the currently selected radio section is excellent, power supply to the other radio sections is limited. If the receiving status is poor, supplying of power to the other radio sections is resumed. It is thereby possible to secure an excellent receiving sensitivity at all times by setting the reference value as described above. A radio section may be switched to another in a similar manner as the conventional example when it has become difficult to use the currently selected radio section; and a reduction in power consumption is possible while maintaining the function for switching among a plurality of radio sections.

Embodiment 2

Figure 3:
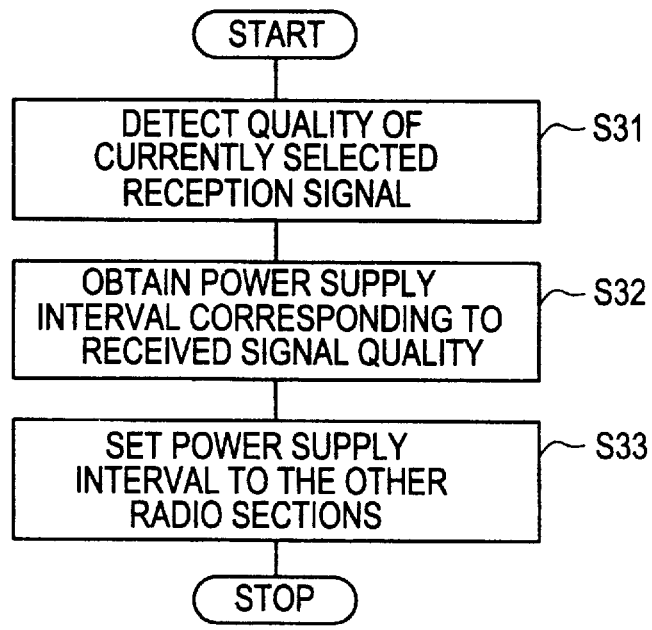
FIG. 3 is an operational flowchart of the control section according to Embodiment 2 of the present invention.

FIG. 3 is a flowchart according to Embodiment 2 showing an operation of the control section 7 after selecting a talking route. A case is shown of intermittently supplying power to the other radio sections based on the value of a reception-signal quality signal.

Figure 4:
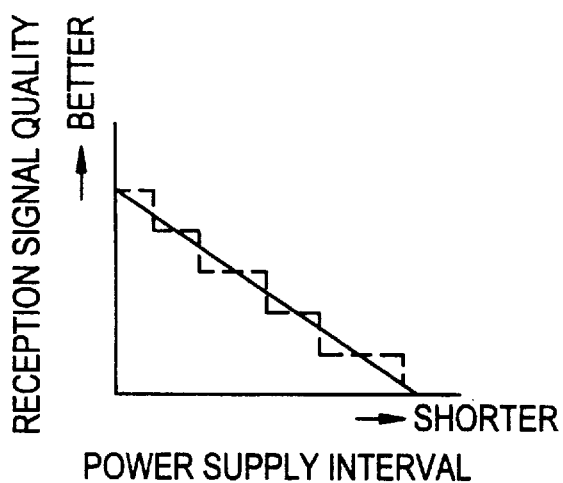
FIG. 4 illustrates the content in the power-supply condition memory section according to Embodiment 3 of the present invention.

Further, FIG. 4 shows a content stored in the power-supply condition memory section 9B according to Embodiment 2. Values of power supplying interval for the other radio sections corresponding to the values of reception-signal quality signal of the currently selected radio section are stored to the power-supply condition memory section 9B. At the control section 7, a power supplying interval value for the other radio sections corresponding to the value of a reception-signal quality signal is obtained from the power-supply condition memory section 9B so as to set a power supplying interval for the other radio sections.

In other words, the control section 7 detects the reception-signal quality signal from the currently selected radio section (step S31) and, based on its result, determines a power supplying interval in accordance with the table values indicating the correspondence as shown in FIG. 4 between values of the reception-signal quality signal of the currently selected radio section and values of power supplying interval to the other radio sections (step S32).

In this manner, interval of power supplying operation to the other radio sections may be longer if the receiving status is excellent, since communication through the currently selected route is possible and the excellent receiving status secures that such route may be stably used. On the contrary, if the receiving status is poor, interval of power supplying operation to the other radio sections is shorter because switching to another route may be necessary. It is thus possible to meet an abrupt worsening of the receiving state of the currently selected radio section.

In accordance with the above described Embodiment 2, the value of interval of power supplying operation for the other radio sections is obtained from the power-supply condition memory section 9B based on the value of a reception-signal quality signal from the currently selected radio section so as to set an interval of power supplying operation for the other radio sections. Since power-supplying state to the other radio sections occurs more often comparing to Embodiment 1, it is possible to immediately meet an abrupt worsening of the receiving status of the currently selected radio section.

Embodiment 3

Figure 5:
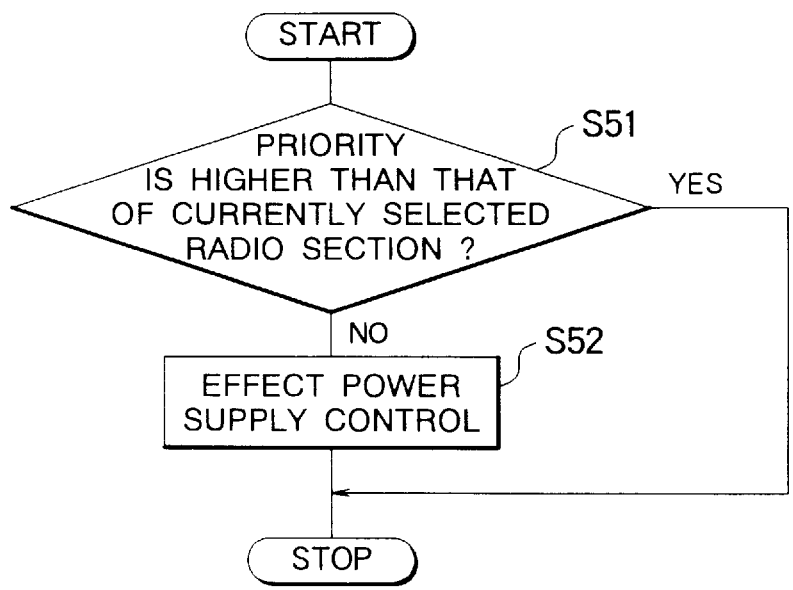
FIG. 5 is an operational flowchart of the control section according to Embodiment 4 of the present invention.

FIG. 5 is a flowchart according to Embodiment 3 showing an operation of the control section 7 after selecting a talking route. Priority of the currently selected radio section is compared with the priority of each of the other radio sections and a control is effected so as to limit supplying of power only for those with lower priority.

It should be noted that, in Embodiment 3, priority for each radio section is set and stored to the talking route selecting condition memory section 9A within the memory section 9 as shown in FIG. 1. The control section 7 compares the priority of a currently selected radio section with the priority of the other radio sections. A power supply control, i.e., stopping of power supply or intermittent supplying as shown in Embodiment 1 or 2 is effected for the other radio sections only when the priority of the other sections is lower.

In other words, the control section 7 compares the priorities of the currently selected radio section and the other radio sections (step S51) and a power supply control is effected only for those with lower priorities (step S52). Here, a power supply control refers to the stopping of power supply or the intermittent supplying as shown in Embodiment 1 or 2. In Embodiment 3, power supply control is effected so as to limit power supply only for the radio sections with a lower priority.

In accordance with Embodiment 3 as described, a comparison of priority is made between the currently selected radio section and the other radio sections. A control is effected so as to limit power supply for the other radio sections only when the priority of the other radio sections is lower. Supplying of power may be controlled by setting priority of each radio section according to selection made by a user, whereby will of the user may be reflected.

Embodiment 4

Figure 6:
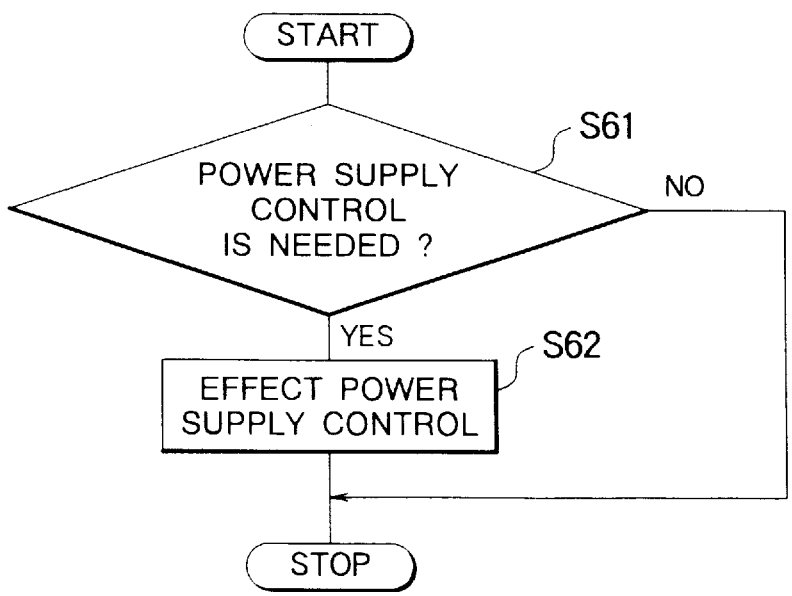
FIG. 6 is an operational flowchart of the control section according to Embodiment 5 of the present invention.
Figure 7:
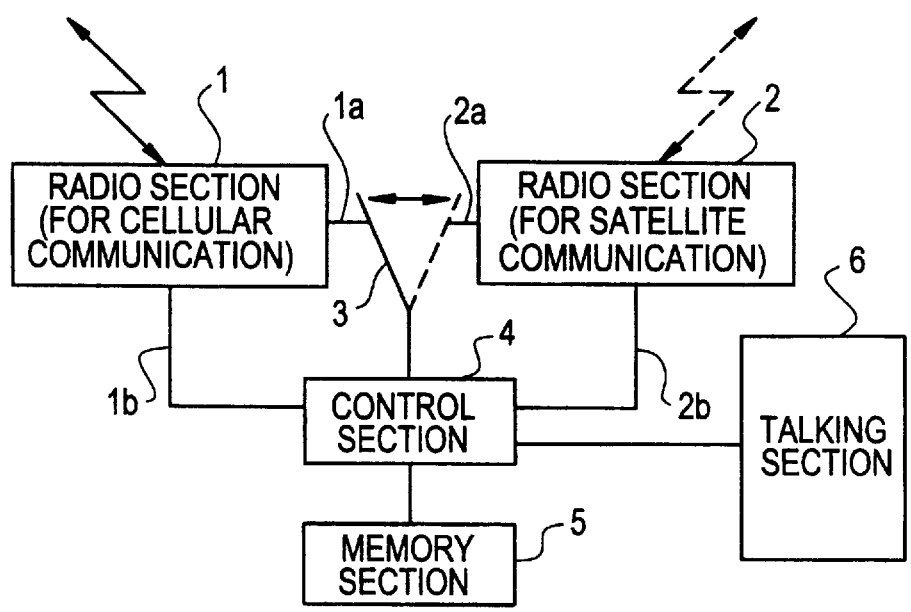
FIG. 7 is a block diagram showing a radio communication apparatus according to a privately known but unpublished example.

FIG. 6 is a flowchart according to Embodiment 4 showing an operation of the control section 7 after selecting a talking route. Indispensability of effecting power supplying control of Embodiments 1 and/or 2 previously recorded by the user is checked for each radio section so as to perform power supply control only when such indispensability is set.

It should be noted that, in Embodiment 4, indispensability or dispensability of power supply control for each radio section is set and stored to the talking route selecting condition memory section 9A within the memory section 9 shown in FIG. 1. The control section 7 checks indispensability of effecting a power supply control for each radio section so as to effect the stopping of power supply or an intermittent supplying as shown in Embodiment 1 or 2 only when it is set as indispensable.

In other words, the control section 7 checks for each radio section an indispensability of effecting power supply control of Embodiment 1 or 2 previously set and stored to the talking route selecting condition memory section 9A by the user (step S61). Power supply control for a radio section, i.e., stopping of power supply or an intermittent supply control as shown in Embodiment 1 or 2 is performed and a control is effected so as to limit power supply only when it is set as indispensable (step S62).

In accordance with the above described Embodiment 4, indispensability of effecting power supply control previously set by the user is checked for each radio section. A control is effected so as to limit power supply to a radio section only when it is set as indispensable. It is possible to control power supply by setting for each radio section indispensability or dispensability of effecting a power supply control according to a selection made by the user, whereby will of the user may be reflected.

As has been described, in accordance with the present invention, power supply to the other radio sections is controlled by the control section based on the value of a reception-signal quality signal from the currently selected radio section and conditions previously set and stored to the power-supply condition memory section. Power to be supplied to the other radio sections is controlled based on the receiving status of the radio section which is being selected. A reduction in power consumption may be achieved while maintaining a changeover function among a plurality of radio sections.

Further, a reference value for controlling power supply is previously set and stored to the power-supply condition memory section. At the control section, the value of a reception-signal quality signal from the currently selected radio section is compared with the reference value previously set and stored to the power-supply condition memory section. Power supply to the other radio sections is stopped when the receiving status of the currently selected radio section is excellent and power supply to the other radio sections is resumed when the receiving status is poor. An excellent receiving sensitivity may be secured at all times by setting a reference value as described. A reduction in power consumption may be achieved while maintaining a changeover function among a plurality of radio sections.

Further, values of power supplying interval for the other radio sections corresponding to the reception-signal quality signal of the currently selected radio section are set and stored to the power-supply condition memory section. The value of power supplying interval for the other radio sections is obtained from the power-supply condition memory section by the control section based on the reception-signal quality signal from the currently selected radio section to set the power supplying interval for the other radio sections. Since power supplying interval to the other radio sections is controlled in accordance with the receiving status of a currently selected radio section, an abrupt worsening in the receiving status of the currently selected radio section may be immediately met by another radio section. An excellent receiving status may be secured at all times. A reduction in power consumption may be achieved while maintaining a changeover function among a plurality of radio sections.

A talking route selecting condition memory section is furthermore provided for previously setting and storing conditions for selecting a talking route. Power supply to the respective radio sections is controlled by the control section based on the conditions previously stored to the talking route selecting condition memory section. Power supply to the respective radio sections may be controlled according to a selection made by the user.

Further, priority for each radio section is set and stored to the talking route selecting condition memory section. At the control section, the priority for the currently selected radio section is compared with the respective priority of the other radio sections. A control is effected so that the power supply to each of the other radio sections is limited only when the respective priority for the other radio sections is lower. Supplying of power may be controlled with a priority for each radio section being set according to a selection made by the user. A control may be effected so as to limit power supply to the radio sections in accordance with such priority.

Furthermore, for each radio section, indispensability or dispensability of power supply control is set and stored to the talking route selecting condition memory section. Indispensability of effecting power supply control stored to the talking route selecting condition memory section is checked for each radio section. A control is effected so as to limit power supply to a radio section only when an indispensability thereof is set. Indispensability or dispensability of effecting power supply control may be set for each radio section according to a selection made by the user. Power supply may be controlled only for those radio sections which require effecting of power supply control.

What is claimed is:

1. A radio communication apparatus having a plurality of radio sections for selectively switching, said radio communication apparatus comprising:

a power-supply condition memory section for previously setting and storing conditions for controlling power supply;

a control section for controlling power supply to the other radio sections based on the value of a reception-signal quality signal from a currently selected radio section and the conditions previously set and stored to said power-supply condition memory section; and a talking route selecting condition memory section for previously setting and storing conditions for selecting a talking route, said control section controlling power supply to the radio sections based on the conditions previously stored to said talking route selecting condition memory section.

2. The radio communication apparatus according to claim 1, wherein a reference value for controlling power supply is previously set and stored to said power-supply condition memory section; and wherein said control section compares the value of a reception-signal quality signal from the currently selected radio section with the reference value previously set and stored to said power-supply condition memory section, said control section stopping power supply to the other radio sections when the receiving status of the currently selected radio section is better, and said control section resuming power supply to the other radio sections when the receiving status is worse.

3. The radio communication apparatus according to claim 1, wherein values of power supplying interval for the other radio sections corresponding to the values of the reception-signal quality signal of the currently selected radio section are set and stored to said power-supply condition memory section, said control section obtaining a value of power supplying interval for the other radio sections from said power-supply condition memory section based on the value of a reception-signal quality signal from the currently selected radio section to set the power supplying interval for the other radio sections.

4. The radio communication apparatus according to claim 1, wherein priority for each radio section is set and stored to said talking route selecting condition memory section; and wherein said control section compares the priority of the currently selected radio section with the priority of the other radio sections and effects control so as to limit power supply to the other sections only when the priority of the other radio sections is lower.

5. The radio communication apparatus according to claim 1, wherein indispensability or dispensability of power supply control with respect to each radio section is set and stored to said talking route selecting condition memory section; and wherein said control section confirms for each radio section the indispensability for effecting a power supply control stored to said talking route selecting condition memory section and effects control so as to limit power supply to a radio section only when set as indispensable.

* * * * *